(12) United States Patent
Shin et al.

(10) Patent No.: US 6,259,698 B1
(45) Date of Patent: Jul. 10, 2001

(54) INPUT BUFFER CONTROLLER USING BACK-PRESSURE SIGNALS IN ATM SWITCHES AND A METHOD FOR DETERMINING THE LOGICAL QUEUE SIZE

(75) Inventors: Jae-Jin Shin, Kwangmyong; Kyung-Geun Lee, Sungnam; Dan-Keun Sung; Jeong-Won Heo, both of Daejon; Sung-Hyuk Byun, Siheung; Ju-Yong Lee, Daegoo; Jin-Woo Yang, Busan, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/095,727

(22) Filed: Jun. 11, 1998

(30) Foreign Application Priority Data

Jun. 11, 1997 (KR) .................................................. 97-24145

(51) Int. Cl.[7] ............................ H04H 12/28; H04H 12/56
(52) U.S. Cl. ............................................. 370/395; 370/235
(58) Field of Search ..................................... 370/395, 230, 370/231, 232, 233, 234, 235, 236, 252, 253, 353, 356, 359, 360, 363, 374, 384, 412, 413, 415, 417, 419, 422

(56) References Cited

U.S. PATENT DOCUMENTS

| | | | |
|---|---|---|---|
| 5,367,520 | 11/1994 | Cordell ................................. | 370/395 |
| 5,440,547 | 8/1995 | Easki et al. ........................... | 709/235 |
| 5,453,980 | 9/1995 | Van Engelshoven ................ | 370/395 |
| 5,521,923 | 5/1996 | Willmann et al. .................... | 370/412 |
| 5,530,806 | 6/1996 | Condon et al. ........................ | 714/49 |
| 5,570,348 | 10/1996 | Holden ................................. | 370/236 |
| 5,583,861 | 12/1996 | Holden ................................. | 370/395 |
| 5,696,764 | * 12/1997 | Soumya et al. ...................... | 370/395 |
| 5,704,047 | 12/1997 | Schneeberger ....................... | 370/395 |
| 5,787,071 | * 7/1998 | Basso et al. .......................... | 370/231 |
| 5,838,677 | * 11/1998 | Kozaki et al. ........................ | 370/229 |
| 6,141,323 | * 10/2000 | Rusu et al. ............................ | 370/236 |
| 6,188,690 | * 2/2001 | Holden et al. ........................ | 370/390 |
| 6,995,486 | * 11/1999 | Iliadis .................................. | 370/369 |

* cited by examiner

*Primary Examiner*—Dang Ton
*Assistant Examiner*—Phirin Sam
(74) *Attorney, Agent, or Firm*—Robert E. Bushnell, Esq.

(57) ABSTRACT

A controller for the logical buffer depth in ATM switching system and a method for determining the logical queue depth, using the back-pressure signal and the occupied buffer depth information and supporting the P classes, are disclosed. The controller includes Routing Table Element making tag for routing of input cell; Input Buffer storing the cell that a tag is attached to in said routing table element; Switch fabric that reads the cell from said input buffer and then switches it to the output port; and Input buffer controller controlling the logical queue size in said input buffer. And the method for determining the logical queue depth includes the steps of calculating the back-pressure signal occurrence rate $b_i$ of the ith class; calculating the back-pressure signal occurrence threshold rate $b_{i\_th}$ of the ith class; calculating the buffer depth $T_i$ of the logical queue of the ith class; calculating threshold values $T_{iH}$, $T_{iL}$ of the two buffer depths of the ith class; calculating the buffer size $L_i$ of the logical queue of the ith class; calculating the empty area size $D_j$ (j=1, 2, 3, L, P) of logical queues for the number of p classes.

9 Claims, 5 Drawing Sheets

INPUT BUFFER CONTROLLER USING BACK-PRESSURE SIGNALS IN ATM SWITCHES AND A METHOD FOR DETERMINING THE LOGICAL QUEUE SIZE

CLAIM OF PRIORITY

This application makes reference to, incorporates the same herein, and claims all benefits accruing under 35 U.S.C §119 from an application entitled An Input Buffer Controller Using Back-Pressure Signals In ATM Switches And A Method For Determining The Logical Queue Depth earlier filed in the Korean Industrial Property Office on Jun. 11, 1997, and there duly assigned Serial No. 97-24145 by that Office.

FIELD OF THE INVENTION

The present invention relates to an Input Buffer Controller of switching system of input buffering type that controls the cell-input to the switching system using the back-pressure signal. More particularly, the invention is intended to improve the cell loss probability that may occur in each input buffer by dynamically changing the logical queue size within the input buffer using the back-pressure signal from the switch fabric and the logical queue depth, that is, it is intended to provide an input buffer controller using back-pressure signals in the asynchronous transfer mode (ATM) switch and an algorithm for determining the logical queue size.

DESCRIPTION OF THE RELATED ART

With the increasing needs for large transfer capacity and high speed transmission of digital data communication network systems, such as the broadband integrated services digital network (BISDN), the development of a more efficient data-transfer routing scheme for such network systems has been in demand. In recent years, as one of the BISDN systems satisfying the requirements, attention is paid to a specific digital data network system that employs a specific packet-oriented data-transfer mode which uses asynchronous time division multiplexing techniques, which is called the asynchronous transfer mode (ATM). ATM is a dedicated-connection switching technology that organizes digital data into 53 byte cells, or packets, and transmits them over a medium using digital signal technology. Individually, a cell is processed asynchronously relative to other related cells and is queued before being multiplexed over the line. Along with SONET (Synchronous Optical Network) and several other technologies, ATM is a key component of BISDN.

The details of the data transmission principles in the ATM communication network system have been described in several recommendations as published by the international telegraph and telephone consultative committee (CCITT).

More specifically, with the ATM network, the multiplexed information flow to be communicated between the sender and receiver terminals is organized into a plurality of cells of fixed size. In ATM switching facilities it is frequently necessary to switch data cells from several input lines to one and the same output line. This is one of the reasons why data cells are temporarily stored before, during, or after the switching process. The temporary storage may be in the form of several parallel queues. The queues are treated by a priority relationship known as priority classes, so that the data cells are served differently according to which queue they belong to.

An ATM switch distinguishes itself from a circuit switch in that it must reconfigure itself essentially every cell period. Furthermore, it must deal with a cell stream from each of its input ports wherein each cell may be destined for a different output port. This leads to contention among cells for output ports, since it is entirely possible for cells from two input ports to be destined for the same output port at the same time. This implies the need for storage somewhere in the switch so that all cells can eventually reach their intended output port.

In many architectures, contention that occurs for an output port means that some portion of the switch is idle while a cell waits, implying degradation in the throughput of the switch. Because of the statistical nature of the arrivals of cells at the input ports and of the destinations, there usually exists some probability of cell loss, which must be minimized. Finally, even if there is no cell loss, periods of considerable contention lead to large numbers of cells being instructed to wait somewhere in the storage media of the switch, implying long delays through the switch for some cells some of the time, leading to variations in transport delay or cell jitter. The following references, incorporated by reference, describe some known ATM system architectures: U.S. Pat. No. 5,367,520 to Robert R. Cordell entitled Method And System For Routing Cells In An ATM Switch; U.S. Pat. No. 5,440,547 to Hiroshi Easki et al. entitled Data-Transfer Routing Management For Packet-Oriented Digital Communication System Including ATM Networks; U.S. Pat. No. 5,453,980 to Robertus J. Van Engelshoven entitled Communication Network And Computer Network Server And INterface Modules Used Therein; U.S. Pat. No. 5,521,923 to Gert Willmann et al. entitled Method And Facility For Temporarily Storing Data Packets, And Exchange With Such Facility; U.S. Pat. No. 5,530,806 to Joseph H. Condon et al. entitled Method And Apparatus For Storing And Retrieving Routing Information In A Network Node; U.S. Pat. No. 5,570,348 to Brian D. Holden entitled Method And Apparatus For Enqueueing Data Cells In An ATM Switch Fabric Architecture; U.S. Pat. No. 5,583,861 to Brian D. Holden entitled ATM Switching Element And Method Having Independently Accessible Cell Memories; and U.S. Pat. No. 5,704,047 to Stefan Schneeberger entitled ATM Communication System herein Upstream Switching Element Stops The Transmission Of Message For A Predetermined Period Of Time Upon Backpressure Signal.

In view of the foregoing references, a simple ATM switch can be constructed by preceding a crosspoint array with a FIFO (first-in-first-out) input buffer on each of its input ports. A contention resolution device then examines all of the output port requests, comparing them against one another, and decides which FIFOs may empty a cell into the switch core, permitting only one cell to be routed to any given output port. Cells that contend and lose will get a chance to leave their FIFO during the next cell period. If none of these input buffers overflows, then there will be no cell loss. A losing contender at the head of one of these queues or lines forces all cells behind it to wait, even if they are destined for an output port that is free.

This type of architecture is called an input buffered switch. A system architecture of a N×N input buffer switching system using a method of input buffering includes a routing table element attaching a routing tag to an ATM input cell using the information of the output port, an input buffer storing the cells being input and a switching fabric having a cell-transmission function between an input port and an output port using the routing tag. A routing table element and an input buffer are required, at a one to one relationship, for every input port and the switching fabric may be comprised of a unit switch or several unit switches.

The cells being input to the switching system, above all, are sent to routing table element, and the routing table element directs the storage of the input cell to the appropriate logical queue within the input buffer according to the class of the input cell. In the switch system, the input buffer is split into a plurality of logical queues to support a plurality of priorities.

The method for transmitting a cell in the logical queues to the routing table element is such that the method checks first in the logical queues if a cell is stored from the logical queue having the highest priority one after another. If there is a cell to be transmitted in the logical queue that has been checked, it checks if there is a back-pressure signal corresponding to the checked logical queue.

The switch fabric has a table that stores the priority of the cell, which is in the shared buffer, and the number of each of the priority cells for each input port. If the cells having the same priorities are transmitted to the same input ports, a collision may happen between the cells having the same priorities and the same input ports. So, a back-pressure signal is used to prevent such a collision.

In a case where the back-pressure signal does not exist, the cell is read from the input buffer and transmitted to the switch fabric through the routing table element. And in a case where the back-pressure signal exists, the method checks if there is a cell that is stored for the logical queue of the next priority and if there is a back-pressure signal corresponding to the logical queue. Namely, the method checks if there is a cell in the logical queue, and if there is not a back-pressure signal, transmits the cell through the switch fabric. Until an input cell is read from the input buffer, the method checks the logical queues and transmits the cell through the input port.

The static allocation for logical queue size has a disadvantage in that it can not accept variations in the dynamic traffic, smoothly.

For example, in case where the cells having a number of priorities are input with equal distribution and the same depths are allocated for each priority buffer, if a large number of cells with a specific priority are input, then empty areas may occur in the logical queues having other priorities and a large number of cell losses occur in the logical queues having the specific priorities are input as the buffers are insufficient.

Namely, in the prior method, the input buffer depth has a fixed allocation area statically. Therefore, if the input traffics are changed quite a bit, compared with the input traffics when the depth of the input buffer is defined, a relatively large cell loss may occur.

As stated above, the method of static allocation for logical queue depth can not accept the characteristics of the traffic being varied dynamically, so a large cell loss may occur.

SUMMARY OF THE INVENTION

The present invention is intended to solve the problem as stated above and the invention has an object to provide an input buffer controller using back-pressure signals in the ATM switch and an algorithm for determining the logical queue depth.

The other object of the present invention is to provide a method for improving the cell loss rate by effectively accepting the input cells having the P priorities using a input buffer, i.e., in order to let the logical queue depth for each priority become dynamically variable, by dynamically allocating the priority buffer size that is allocated to each priority class using the information of logical queue depth such as the occurrence rate of the back-pressure signal, the allocated amount and the number of cells that are actually stored in the logical queue.

The present invention discloses a controller for the logical queue size in ATM switch system, using back-pressure signal and the occupied buffer depth information and supporting the P classes. The controller includes a routing table element making a tag for routing of an input cell; an input buffer storing the cell that a tag is attached to in the routing table element; a switch fabric that reads the cell from the input buffer and then switches it to an output port; and an input buffer controller controlling the logical queue size in the input buffer.

It is preferable that the cell loss rate is decreased by sending the logical queue size, which is determined periodically in the input buffer controller, to the routing table element and by dynamically changing the logical queue size in the input buffer.

Additionally, it is preferable that the input buffer controller making the logical queue size control signal further includes a back-pressure signal counter part counting the number of generation of the back-pressure signal; a processing part calculating the logical queue allocation size using the information received from the back-pressure signal counter and the routing table element; and a control signal generating part producing the logical queue size control signal to send to the routing table element.

Further, it is preferable that the input buffer controller receives the information of the back-pressure signal from the back-pressure signal counter part and receives the information of the buffer depth from the routing table element, and then performs a calculation of the logical queue size using a method for determining of the logical queue size and generates the logical queue size control signal that is calculated from the control signal generating part.

In addition, the present invention discloses a method for dynamically changing the logical queue size in the input buffer, in an ATM switch system, using back-pressure signals and the occupied buffer depth information and supporting the P classes.

The foregoing objects and features, as well as other objects and advantages of the invention, will become apparent upon reading the following detailed descriptions and upon reference to the drawing.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
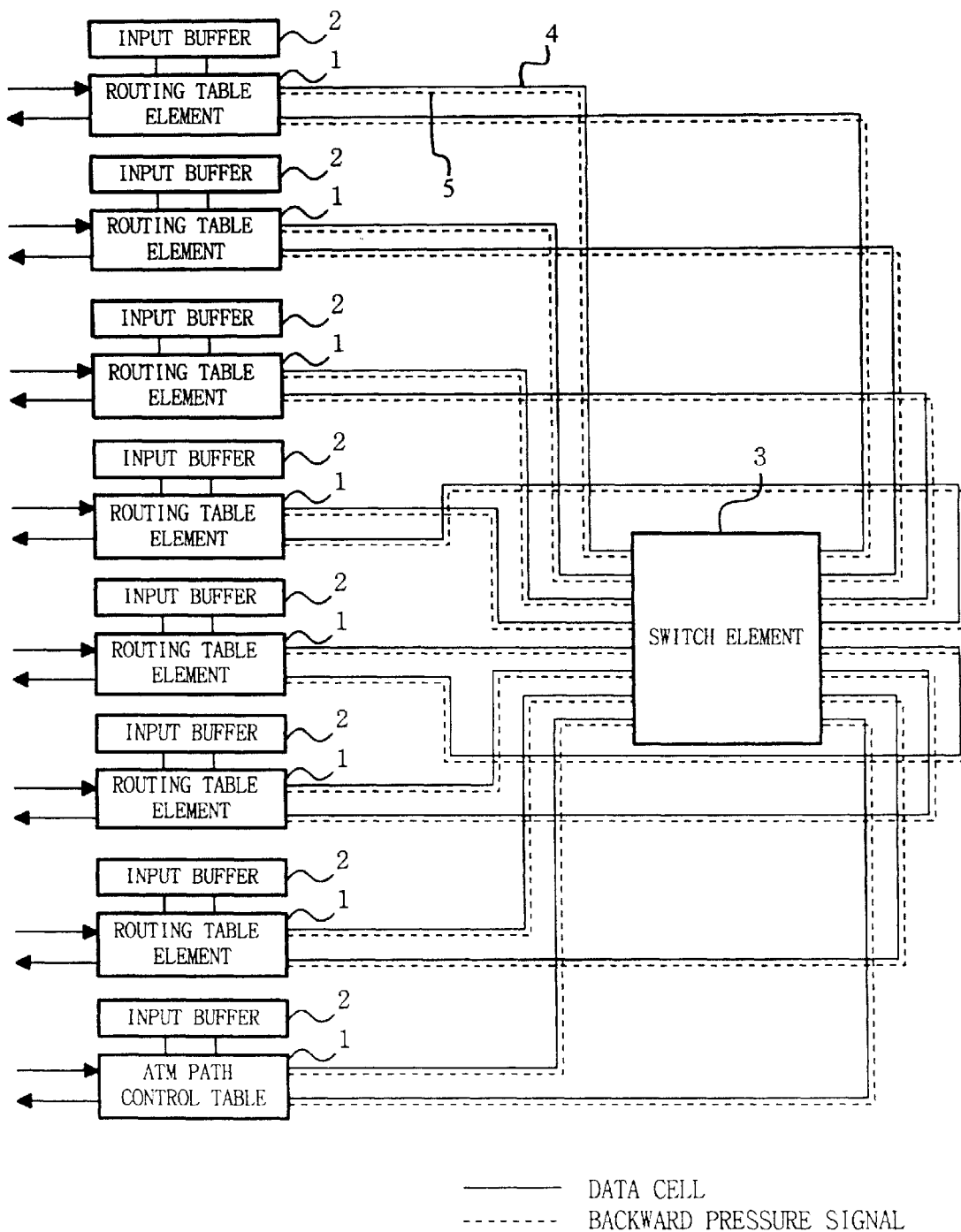
FIG. 1 shows an architecture of N×N switching system in which the present invention is to be utilized.

FIG. 1 illustrates a basic system architecture of N×N input buffer switching system using a method of input buffering. The switching system includes a routing table element (1) attaching a routing tag to an ATM input cell using the information of the output port, an input buffer (2) storing the cells being input and a switching fabric (3) having a cell-transmission function between an input port an output port using the routing tag. A routing table element (1) and an input buffer (2) are required, at a one to one relation, for every input port and the switching fabric may be comprised of a unit switch or several unit switches.

The cells being input to the switching system, above all, are sent to routing table element (1), and routing table element (1) directs the storage of the input cell to the appropriate logical queue within input buffer (2) according to the class of the input cell. In the switch system, input buffer (2) is split into P logical queues to support P priorities. The logical queue depth corresponding to each priority is determined in routing table element (1). The cell stored as stated above is read from each logical queue in the method of FIFO (first-in-first-out) according to the priority and transmitted to routing table element (1). By using output port information of the cell transmitted to routing table element (1), the path information of switch fabric (3) is made and a tag is attached to the cell so that a path of the cell to be switched in said switch fabric is pre-determined. The cell having the attached tag is transmitted to the output port through the switch fabric.

The method for transmitting a cell in the P logical queues to routing table element (1) is such that the method checks first in the P logical queues if a cell is stored from the logical queue having the highest priority one after another. If there is a cell to be transmitted in the logical queue that has been checked, it checks if there is a back-pressure signal corresponding to the checked logical queue.

Switch fabric (3) has a table that stores the priority of the cell, which is in the shared buffer, and the number of each of the priority cells for each input port. If the cells having the same priorities are transmitted to the same input ports, a collision may happen between the cells having the same priorities and the same input ports. So, a back-pressure signal is used to prevent such a collision.

In a case where the back-pressure signal does not exist, the cell is read from input buffer (2) and transmitted to switch fabric (3) through routing table element (1). And in a case where the back-pressure signal exists, the method checks if there is a cell that is stored for the logical queue of the next priority and if there is a back-pressure signal corresponding to the logical queue. Namely, the method checks if there is a cell in the logical queue, and if there is not a back-pressure signal, transmits the cell through switch fabric (3). Until an input cell is read from input buffer (2), the method checks the P logical queues and transmits the cell through the input port.

In FIG. 1, a solid line (4) between switch fabric (3) and routing table element (1) represents the transmission of a data cell from input buffer (2) to switch fabric (3). The cell is transmitted to the output port of switch fabric (3) through the input port of switch fabric (3). A dotted line (5) represents the back-pressure signal that is transmitted from the input port of switch fabric (3) to the output port side of routing table element (1).

Figure 2:
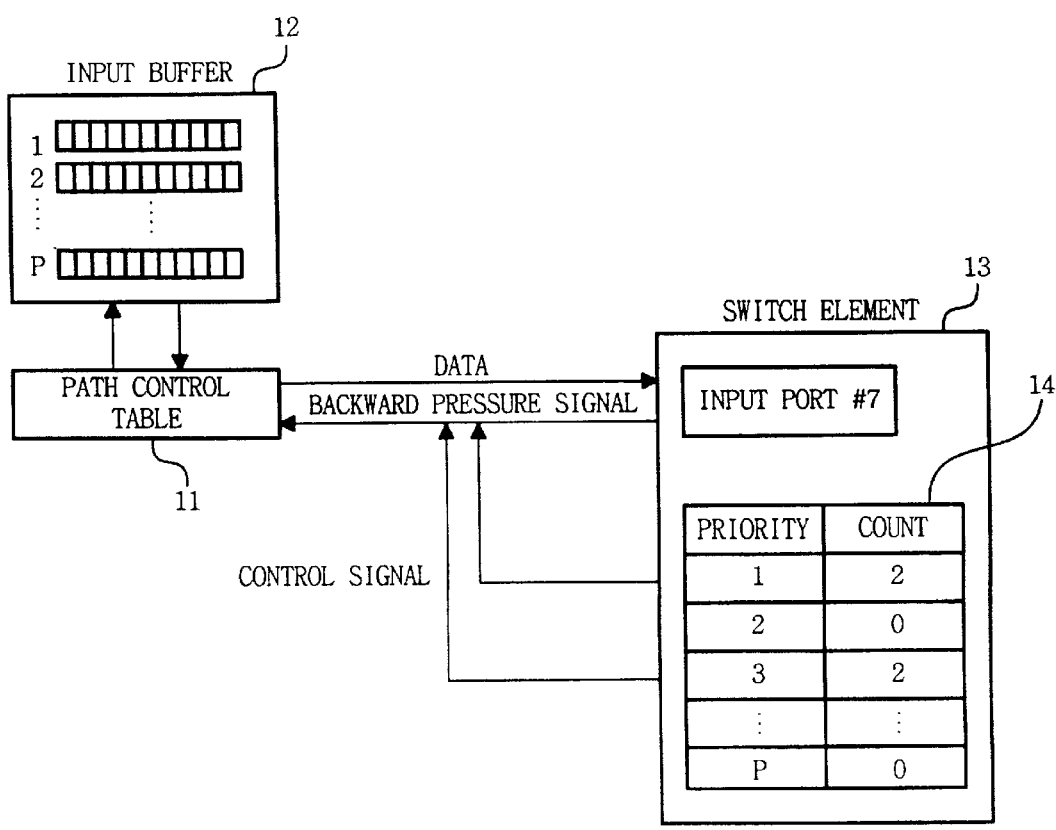
FIG. 2 shows a structure illustrating a procedure for generating of a back-pressure signal.

FIG. 2 illustrates the procedure for generating of the back-pressure signal explained briefly above. A unit switch fabric (13) records information on how many cells having the different priorities, input via the input port, are stored in the buffer pool in the switch fabric. The embodiment in FIG. 2 shows a table (14) illustrating the number of cells by priority such that the cells are stored in the input port 7. Suppose that the threshold value of each class is 2, two cells of the class with priority 1 and two cells of the class with priority 3 are stored, so it transmits the back-pressure signal to the routing table element (11) so that cells of the class with priority 1 and cells of the class with priority 3 are not transmitted. The back-pressure signal is transmitted to the routing table element (11) through the corresponding input port when the number of cells of the class with the specific priority is greater than or equal to the threshold value by class, b, in that the cells have been transmitted to the specific input port of the unit switch fabric (13) and when the total number of cells that are stored in the unit switch fabric (13) is greater than the pre-determined total threshold value, a. For example, in case where the value of b is 2 and the value of a is 24, the back-pressure signals are transmitted to all of the input ports. In addition, when the number of cells of the specific classes is two or more, wherein the cells have input to the specific input port of the unit switching fabric (13), the back-pressure signals are transmitted to the routing table in the front side through the corresponding input port.

In the method of controlling the input buffer by the input buffer controller in the input buffer switch using the prior way of input buffering as stated above, an input buffer can be used for the P logical queues to support the P priorities and the size of each logical queue can be determined in the routing table (11).

Figure 3:
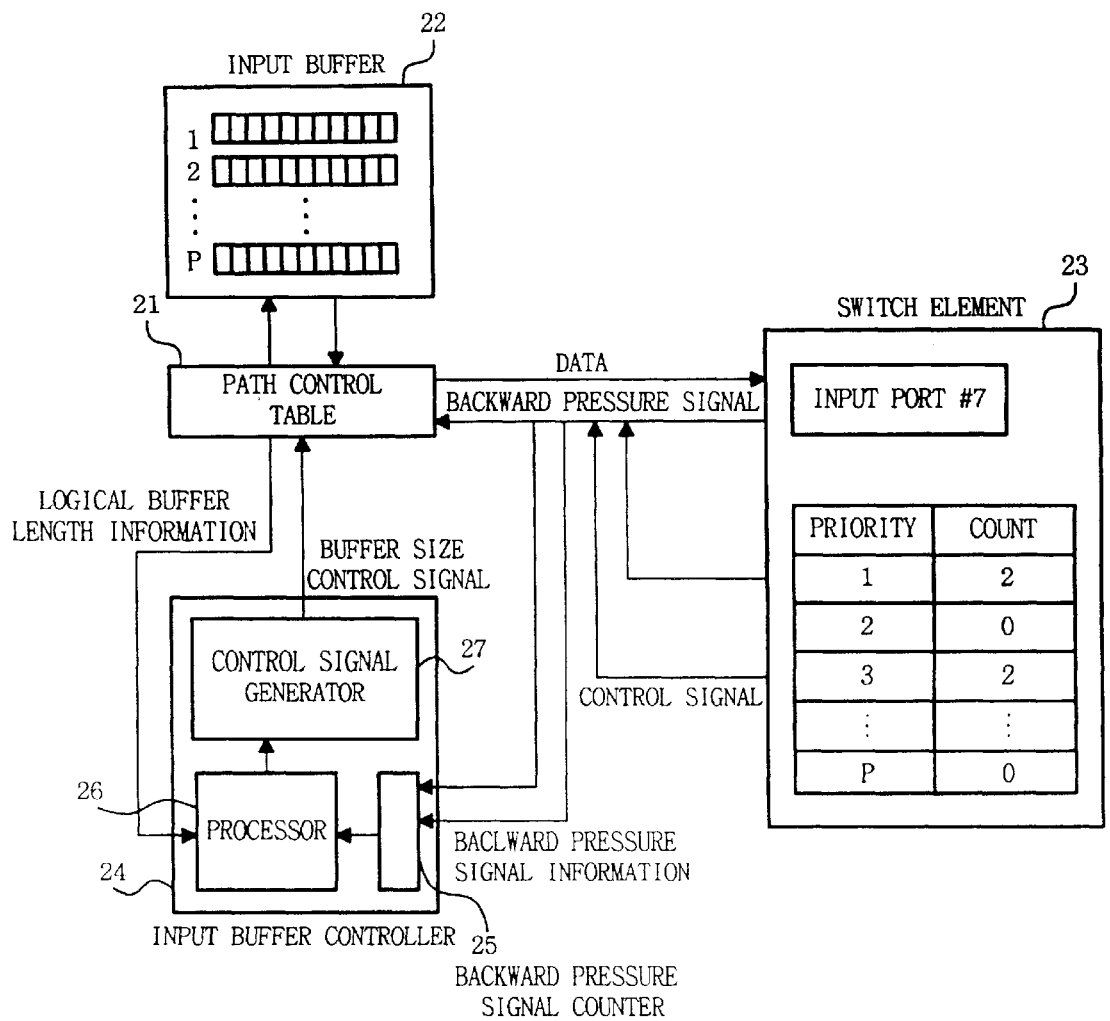
FIG. 3 shows a structure illustrating an input buffer controller according to the principles of the present invention.

FIG. 3 illustrates a structure of an input buffer controller (24) of the present invention. Referring to the FIG. 3, the detailed explanation for the input buffer controller (24) in the present invention is as follows. The input buffer controller (24) includes a back-pressure signal counter part (25) that receives a back-pressure signal from a switch fabric (23) by priority class and checks the number of back-pressure signals, a processing part (26) calculates the size of logical queue allocation every time interval (cell time) W for conversion of logical queue size, and a control signal generating part (27) generates a buffer size control signal to be sent to routing table element (21). The routing table element (21) changes the buffer size in the input buffers (22) every cell time W using the buffer size control signal.

In input buffer controller (24), back-pressure signal counter part (25) receives the back-pressure signal and counts the number of back-pressure signals by each priority class and then stores the count information and then the count information is transmitted to processing part (26). The count information is the number of back-pressure signals which are counted during the cell time W defined as the time interval for conversion of logical queue size. After the transmission of the count information for the back-pressure signals, the back-pressure signal counter part (25) is initialized so that the occurrence number of the back-pressure signals can be counted during the next time interval for conversion of logical queue size, i.e., cell time W.

Processing part (26) calculates the logical queue size every cell time interval W on the following algorithm for determining of logical queue size using the information such as the count of back-pressure signals that are received from the back-pressure signal counter part, the size for each logical queue that are received from the routing table element and the number of cells occupying the logical queue at the present time.

The algorithm for determining of logical queue size finds $K_i$, the occurrence count for the back-pressure signals for the cells of the class having the ith priority during the cell time W. So, the occurrence rate of the back-pressure signals for the cells of the class having the ith priority is the value of $K_i$ divided by cell time interval W. That is, when it is assumed that the occurrence rate of the back-pressure signals is $b_i$, the value of $b_i$ becomes such that $b_i=K_i/W$.

Figure 4:
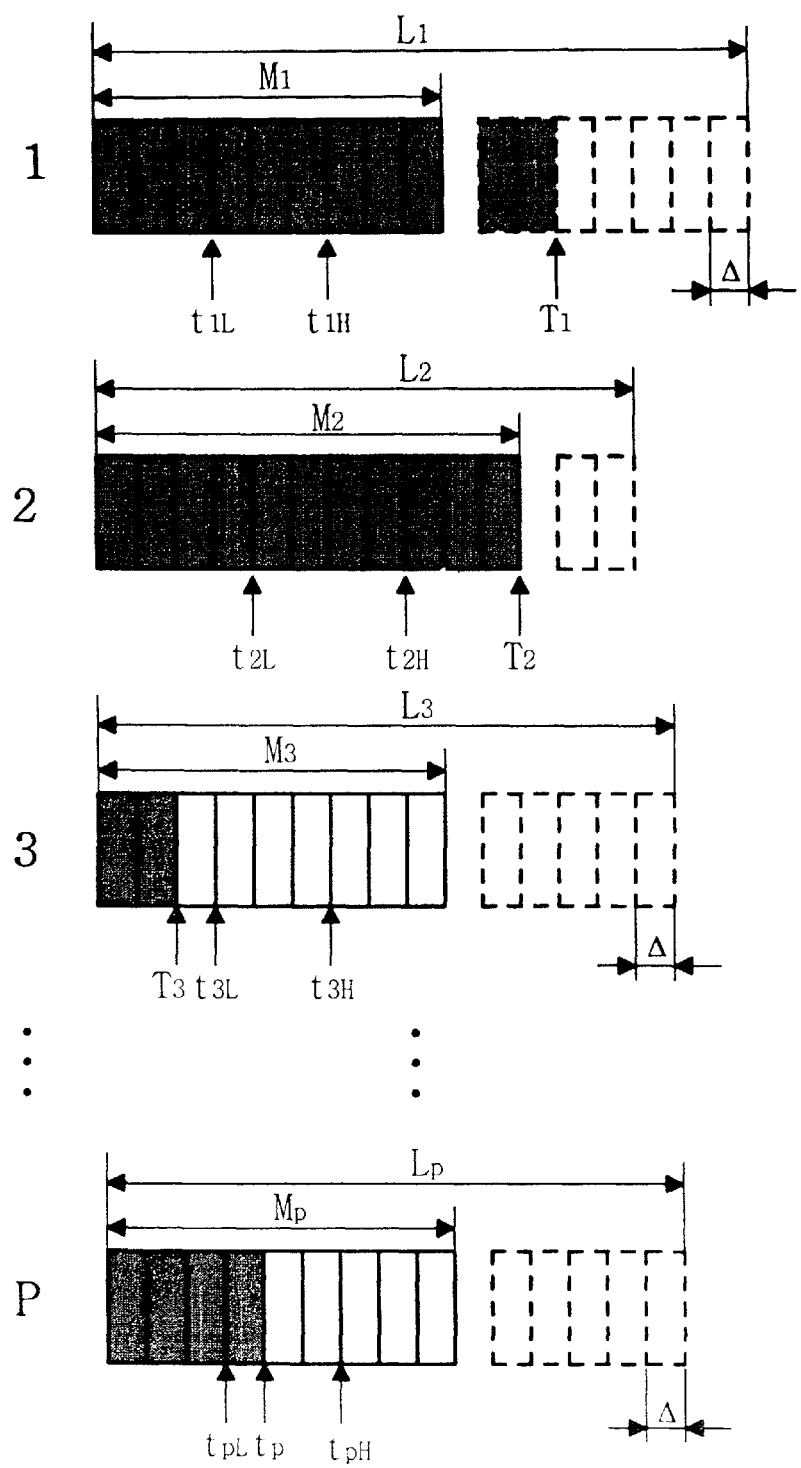
FIG. 4 shows a detailed view of logical queue for explaining an algorithm for determining the logical queue depth according to the principles of the present invention.
Figure 5:
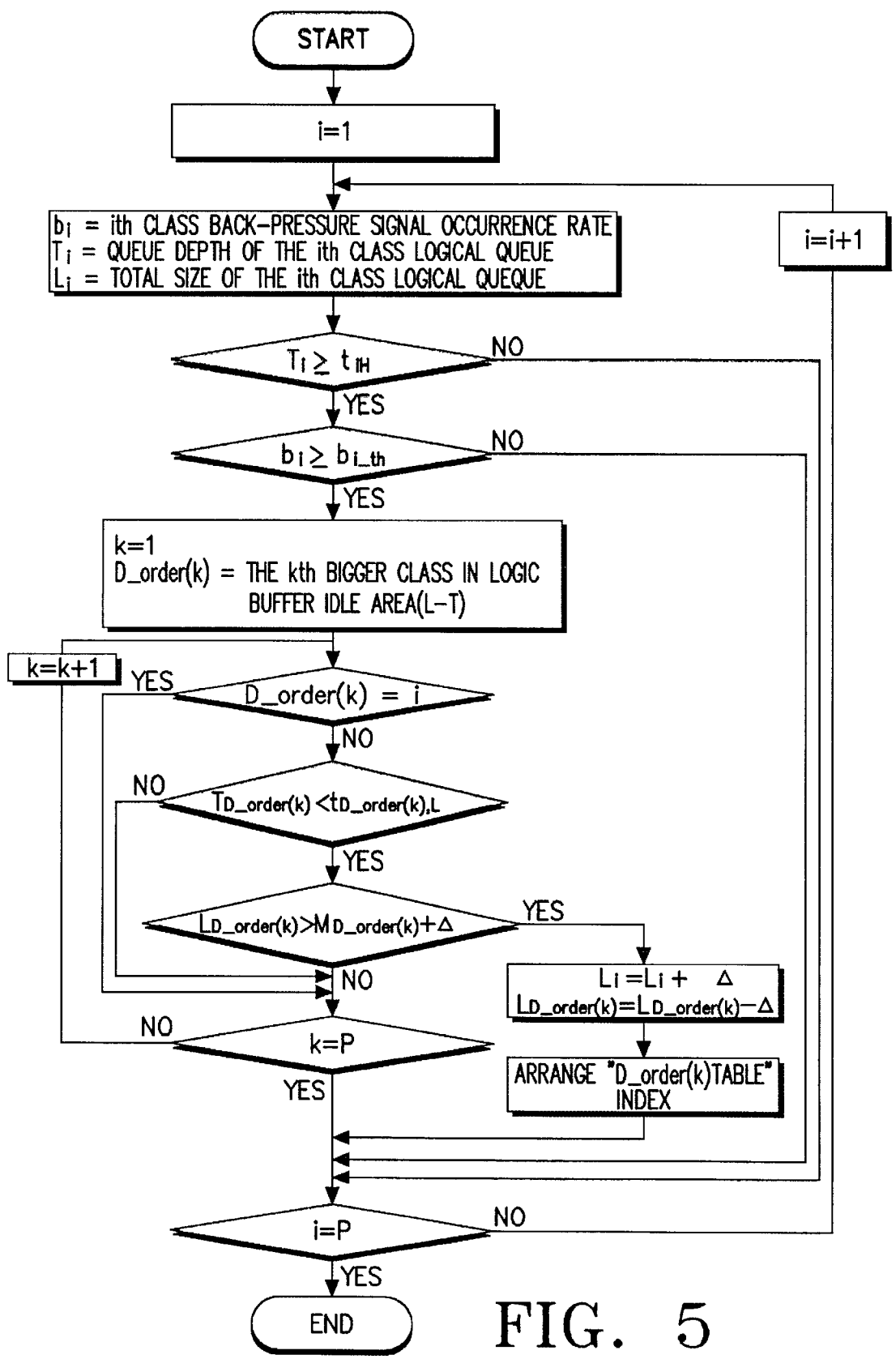
FIG. 5 shows a flow chart illustrating an algorithm for determining the logical queue depth according to the principles of the present invention.

FIG. 4 illustrates a detailed view of the logical queue to explain the algorithm for determining of logical queue size by the present invention. And FIG. 5 shows a flow chart illustrating the algorithm for determining of logical queue size by the present invention. The algorithm in the present invention is explained for an algorithm in the present invention referring to FIG. 4 and FIG. 5 as follows.

Input buffer (22) of FIG. 3, is split into P logical queues to provide P priorities and the logical queue for the cell having the ith priority has a fixed allocation area to store $M_i$ cells. And including the additionally allocated buffer cells $T_i$ corresponding to the logical queue depth can be stored. The fixed allocation area $M_i$ is a value that is assigned statically and the logic queue size $L_i$ is the value that is updated every cell time interval W.

The logical queue for the cell with the ith priority has two thresholds, $t_{iH}$ and $t_{iL}$ ($t_{iL} \leq t_{iH}$).

Regarding the two thresholds, $t_{iH}$ is the value that is used when it is necessary to increase the logical queue size and $t_{iL}$ is the value that is used when it is necessary to decrease the logical queue size. Assuming that $T_i$ is the queue depth of the cell practically occupying the logical queue for the cell having the ith priority and $\Delta$ is the minimum unit for buffer allocation, processing part (26) calculates the logical queue size every cell time interval W.

When the occurrence rate of the back-pressure signal for the cell with the ith priority, $b_i$ is greater than the predetermined threshold, $b_{i\_th}$ and the queue depth $T_i$ is greater than the threshold of the queue depth $T_{iH}$, in order to increase the logical queue size for the cell with ith priority by $\Delta$, the size of the logical queue having the greatest difference between $L_j$ and $T_j(L_j-T_j)$ is decreased and difference is allocated to the logical queue for the cell having the ith priority. In result, the size of the ith logical queue is $L_i+\Delta$ from $L_i$ and the size of the jth logical queue decreased by $\Delta$, is $L_j-\Delta$.

In the flow chart of FIG. 5, $b_i$ represents the occurrence rate for the back-pressure signal of the cell having the ith priority, $T_i$ represents the number of cells (logic queue depth) practically being stored in the ith logical queue and $L_i$ represents the total size of the ith logical queue (logic queue size). The processing part (26) calculates each logical queue size $L_i(i=1,2,\ldots,P)$ according to P priorities within the input buffer every cell time W as the time interval for logical size conversion, by using the algorithm for determining the logical queue size as stated above. First, it checks whether the occurrence rate for the back-pressure signal of the cell having the ith priority $b_i$ is greater than the threshold, $b_{i\_th}$ of the occurrence rate for the back-pressure signal and whether the number of cells being stored in the logic queue, $T_i$ is greater than the threshold, $T_{iH}$ of the logic queue depth. If it is a case where all of them exceed the two thresholds, it checks whether the logical queue size ($L_i$) can be changed. If it is the other case, it checks the logical queue with the next priority class.

As the size of the logical queue of the other priority class needs to be decreased by $\Delta$ in order to increase the size of the specific logical queue by $\Delta$, first of all, it should check whether the sizes of other logical queues could be decreased. So it is checked whether the logical queue size can be decreased in the descending order of logical queue empty area $L_j-T_j(j \neq i)$ for the P−1 logical queues except for the logical queue of ith priority class. In the above flow chart, "D_order (k)" (k=1, 2, ..., P) represents the class of the logical queue wherein the logical queue empty area is the kth large. Namely, "D_order (2)" is regarded as the logical queue of the second priority class wherein the logical queue empty area is second large in the total P logical queues. By checking whether the logical queue having the largest empty area of the "D_order (1)" class is less than or equal to the threshold of the logic queue depth $t_{D\_order(1),L}$ (i.e., $t_{iL}$) and by checking whether the additional allocation area, $L_{D\_order(1)}-M_{D\_order(1)}$ is greater than the minimum allocation $\Delta$, if the above two are all satisfied, it decreases $L_{D\_order(1)}$, the logical queue size of the "D_order (1)" priority class by $\Delta$ and increases the logical queue size of the ith priority class by $\Delta$. If any one of the two conditions is not satisfied, the checking of logical queue of the next priority class is continued varying the value of k. And if the priority class satisfying the two conditions is found or if it has checked to the "D_order (P)" priority class of the buffer having the smallest empty area, then it is finished. The size of logical queue empty area is changed every logical queue size assignment, so once the logical queue size is modified, then the records of a table including the "D_order (K)" information is updated with sorting.

After determining of the logical queue size of the ith priority class ($L_i$) as stated above, the logical queue size of the (i+1)th priority class ($L_{i+1}$) is determined through the same steps. Here, the size of cell time interval W, the size of the fixed allocation area $M_i$, two thresholds $t_{iH}$ and $t_{iL}$, minimum unit for buffer allocation $\Delta$ and threshold of back-pressure signal $b_{i\_th}$ etc. are determined according to the characteristics of switching system, input buffer size, the number of priority class and the input process of input traffic.

The control signal generating part (27) generates the logical queue size control signal every cell time interval W and transmits it to the routing table element (21). The input buffer controller (24) determines the logical queue size for each priority class and transmits it to the routing table element (21). And using it, routing table element changes the logical queue size for each priority class dynamically and transmits the information of logical queue size for each updated priority class to the processing part (26) in the input buffer controller (24). When a method for controlling the input buffer by the present invention is used, the cell loss rate can be improved. The input buffer controller (24) can comprise the extra controllers by each input port like a switch fabric or comprise an input buffer controller for controlling the all of the input buffers (22). FIG. 3 illustrates an embodiment using the extra controller by each input port.

The input buffer controller (24) using a input buffering method in the present invention is characterized in that it controls the cells being input to the switching fabric (23) by using the back-pressure signal from the switching fabric (23) and the number of cells being practically stored in the logical queue, and it can change the logical queue size by each priority class dynamically and move to the cell input process dynamically to improve the cell loss rate.

What is claimed is:

1. An input buffer controller for controlling logical queue size of a logical queue in an input buffer of an asynchronous transfer mode (ATM) switch system, comprising:
   a back-pressure signal counter for receiving and counting each back-pressure signal output from a switching element of said ATM switch system during a cell time interval;
   a processor for calculating a logical queue size based on count information output from said back-pressure signal counter, size information of said logical queue and information indicating a how many cells currently occupy said logical queue;

a control signal generator responsive to the calculated logical queue size for generating a logical queue size control signal for changing said logical queue size.

2. An asynchronous transfer mode (ATM) switching system comprising a switching element having a first plurality of input ports for receiving cells of data and a second plurality of output ports for transmitting cells of data, and a routing table for controlling which of said input and output ports are connected in said switching element, said system further comprising:

an input buffer consisting of plural logical queues arranged therein, wherein each logical queue is assigned a different priority class;

a routing table element for directing the storage of said input cell to an appropriate one of said logical queues in said input buffer according to a priority class of said input cell and for outputting a tagged cell by attaching a tag to a cell output from said input buffer, said tagged cell being transmitted to said input port of said switching element; and an input buffer controller for controlling changing a logical queue size of one of said logical queues in said input buffer in response to a back-pressure signal output from said switching element.

3. The system as set forth in claim 2, wherein said input buffer controller comprises:

a back-pressure signal counter for receiving and counting each back-pressure signal output from said switching element during a cell time interval;

a processor for calculating said logical queue size based on count information output from said back-pressure signal counter, size information of one of said logical queues of said input buffer and a logical queue depth indicating a how many cells currently occupy said one of said logical queues; and a control signal generator responsive to the calculated logical queue size for generating a logical queue size control signal for changing said logical queue size of said one of said logical queues.

4. The system as set forth in claim 3, wherein said processor divides said count information by said cell time interval to generate an occurrence rate, compares said logical queue depth to a depth threshold, compares said occurrence rate to a rate threshold and, when said logical queue depth is equal to or greater than said depth threshold and said occurrence rate is equal to or greater than said rate threshold, calculates said logical queue size.

5. The system as set forth in claim 3, wherein said processor calculates said logical queue size for each of said logical queues during every cell time interval.

6. A method of determining logical queue size $L_i$, where i=(1, 2, 3, ..., P), of each of P logical queues of an input buffer which stores input data cells according to a priority class of said data cells in an asynchronous transfer mode (ATM) switch system, wherein each said logical queue corresponds to a different priority class, said ATM switch system having a switching element that includes a first plurality of input ports for receiving cells of data and a second plurality of output ports for transmitting cells of data, a routing table for controlling which of said input and output ports are connected in said switching element, and an input buffer controller for controlling logical queue size of each said logical queues in said input buffer every cell time interval W in response to a back-pressure signal output from said switching element, said method comprising steps of:

counting each back-pressure signal generated during said cell time interval W;

dividing a result $K_i$ of said counting step by said cell time interval W to derive a back-pressure signal occurrence rate $b_i$ of an ith class;

determining the logical queue depth $T_i$ of the logical queue of the ith class;

calculating the logical queue size $L_i$ of the logical queue of the ith class;

comparing said logical queue depth $T_i$ to a depth threshold values $T_{iH}$ of the ith class;

comparing said the back-pressure signal occurrence threshold rate $b_{i\_th}$ of the ith class when it is determined that logical queue depth $T_i$ is equal to or greater than said depth threshold value $T_{iH}$;

determining whether i=P when either of said comparing steps provides a negative result;

increasing i by 1 when it is determined that i does not equal P and returning to said dividing step;

determining whether said logical queue size of said logical queue of the ith class can be changed when both of said comparing steps provide a positive result; and changing said logical queue size of said logical queue of the ith class, when it is determined that said logical queue size of said logical queue of the ith class can be changed and returning to said step of determining whether i=P.

7. The method as set forth in claim 6, wherein said step of determining whether said logical queue size of said logical queue of the ith class can be changed when both of said comparing steps provide a positive result comprises steps of:

setting a variable k equal to 1;

setting variable D_order(k) equal to the kth bigger class in logic queue idle area (L−T);

determining whether D_order(k)=i;

determining whether logical queue depth $T_{D\_order(k)}$ is less than second depth threshold $t_{D\_order(k),L}$ when it is determined that D_order(k) does not equal i;

determining whether the logical queue size of the logical queue of the D_order(k)th class is greater than $M_{D\_order(k)}+\Delta$, wherein $M_{D\_order(k)}$ a predetermined allocation area for storing data cells in the said logical queue of the D_order(k)th class and $\Delta$ is at least equal in size to one data cell, when it is determined that said logical queue depth $T_{D\_order(k)}$ is less than said second depth threshold $t_{D\_order(k),L}$;

performing said step of changing said logical queue size of said logical queue of the ith class, when it is determined that the logical queue size of the logical queue of the D_order(k)th class is greater than said predetermined allocation area $M_{D\_order(k)}+\Delta$.

8. The method as set forth in claim 7, further comprising steps of:

determining whether variable K is equal to P, when it is determined that D_order(k) is equal to i, when it is determined that said logical queue depth $T_{D\_order(k)}$ is not less than said second depth threshold $t_{D\_order(k),L}$, or when it is determined that the logical queue size of the logical queue of the D_order(k)th class is not greater than said predetermined allocation area $M_{D\_order(k)}+\Delta$; and increasing said variable k by one and returning to said step of determining whether D_order(k) is equal to i.

9. The method as set forth in claim 7, wherein said step of changing said logical queue size of said logical queue of said ith class comprises steps of:

increasing said logical queue size of said logical queue of the ith class by said difference variable $\Delta$;

decreasing said logical queue size of said logical queue of the D_order(k)th class by $\Delta$; and updating and sorting a D-order(k) table and returning to said step of determining whether i=P.

* * * * *